United States Patent [19]

Pryor et al.

[11] Patent Number: 5,465,188
[45] Date of Patent: Nov. 7, 1995

[54] CIRCUIT PROTECTION DEVICE

[75] Inventors: Dennis M. Pryor; Michael Challis, both of Swindon, England

[73] Assignee: Raychem Limited, United Kingdom

[21] Appl. No.: 75,521

[22] Filed: Dec. 12, 1991

[86] PCT No.: PCT/GB91/02215

§ 371 Date: Jun. 10, 1993

§ 102(e) Date: Jun. 10, 1993

[87] PCT Pub. No.: WO92/10878

PCT Pub. Date: Jun. 25, 1992

[30] Foreign Application Priority Data

Dec. 13, 1990 [GB] United Kingdom ............... 9027111

[51] Int. Cl.$^6$ ........................................ H02H 3/20
[52] U.S. Cl. ............................... 361/18; 361/58; 361/91
[58] Field of Search ............................. 361/18, 74, 75, 361/58, 91

[56] References Cited

U.S. PATENT DOCUMENTS

| | | | |
|---|---|---|---|
| 3,801,872 | 4/1974 | Zocholl et al. | 317/22 |
| 4,021,701 | 5/1977 | Davies | 361/18 |
| 4,202,023 | 5/1980 | Sears | 361/18 |
| 4,241,372 | 12/1980 | Sears | 361/72 |
| 4,423,457 | 12/1983 | Brajder | 361/86 |
| 4,438,473 | 3/1984 | Cawley et al. | 361/18 |
| 4,513,343 | 4/1985 | Ryczek | 361/101 |
| 4,604,674 | 8/1986 | Hamel | 361/73 |
| 4,771,357 | 9/1988 | Lorinez et al. | 361/87 |
| 4,809,122 | 2/1989 | Fitzner | 361/18 |
| 4,937,697 | 6/1990 | Edwards et al. | 361/18 |

FOREIGN PATENT DOCUMENTS

| | | | |
|---|---|---|---|
| 1233475 | 2/1967 | Germany . | |
| 2431167 | 1/1976 | Germany | H02H 7/22 |
| 2440947 | 3/1976 | Germany | G05F 1/58 |
| 3433538 | 3/1986 | Germany | G05F 1/569 |
| 3725390 | 9/1989 | Germany | H02H 3/08 |
| 1467055 | 3/1977 | United Kingdom | H02H 3/08 |
| 1481458 | 7/1977 | United Kingdom | H03K 17/08 |
| WO86/03079 | 5/1986 | WIPO | H03K 17/687 |
| WO91/07402 | 10/1991 | WIPO | H02H 3/02 |
| WO91/07403 | 10/1991 | WIPO | H02H 3/087 |

OTHER PUBLICATIONS

British Search Report, GB 9027111.5, Mar. 26, 1991.
International Search Report, Application No. PCT/GB91/02215, filed Dec. 12, 1991.
International Search Report, PCT/GB91/01761, Jan. 24, 1992.
British Search Report, GB 9022261.3, Jan. 25, 1991.
Siemens–Bauteile Informationen/Horst von Pelka, vol. 4, #6, 1968, Munchen DE, pp. 106–109.
"Various Types of Power Supply Protection Circuits", Switching Power Supply Units, Chapter 8, pp. 209–229.

Primary Examiner—Todd Deboer
Attorney, Agent, or Firm—Marquerite E. Gerstner; Herbert G. Burkard

[57] ABSTRACT

A circuit protection arrangement that is intended to be series connected in a line of an electrical circuit comprises a transistor switch 1 that controls the circuit current and has a control input, and a control arrangement that controls the voltage of the control input of the switch The control arrangement comprises a comparator circuit 3 that compares a fraction of the voltage across the switch 1 with a reference voltage, for example supplied by a Zener diode or bandgap diode, and opens the switch if the fraction is greater than the reference voltage. The comparator circuit is powered by the voltage drop in the line across the switch so that the arrangement can be formed as a two-terminal device that requires no external power source.

The arrangement has the advantage that it exhibits a relatively small variation in performance with respect to temperature variations.

19 Claims, 4 Drawing Sheets

CIRCUIT PROTECTION DEVICE

BACKGROUND OF THE INVENTION

1. Field of the Invention

This invention relates to arrangements and devices for protecting electrical circuits from overcurrents, for example from overcurrents caused by equipment faults, electrostatic discharge or other threats.

2. Introduction to the Invention

One circuit protection arrangement of relatively simple form is described in German Patent Application No. 37 25 390 dated Jul. 31, 1987 to Wickmann-Werke GmbH. This arrangement comprises a series switching transistor that controls the circuit current and a control transistor that controls the base or gate voltage of the switching transistor. The base or gate voltage of the control transistor is set by a voltage divider that spans the switching transistor, so that, if the arrangement experiences an overcurrent, the control transistor will be biased into conduction and will turn the switching transistor OFF. Although this device is particularly simple, it suffers from the disadvantage that its performance can vary considerably with temperature. For example, in many cases the current required to open the switching transistor (the "trip current") will fall to a small fraction of the ambient trip current when the temperature rises to 100° C. or so. Thus, in normal operation of the circuit, it is usually only possible to pass a very small fraction, eg. about 20%, of the trip current through the switch. If larger currents are allowed to pass, heating of the switching transistor (due to a voltage drop across it that is always in the order of a few volts) will cause the trip current level to fall, with the result that tripping of the arrangement will at some stage occur with the normal circuit current.

SUMMARY OF THE INVENTION

According to the present invention, there is provided a circuit protection arrangement that is intended to be series connected in a line of an electrical circuit, which comprises a transistor switch that controls the circuit current and has a control input, and a control arrangement that controls the voltage of the control input and is responsive to an overcurrent through the switch, the control arrangement comprising a comparator circuit that compares a fraction of the voltage across the switch with a reference voltage and opens the switch if the fraction is greater than the reference voltage, the comparator circuit being powered by the voltage drop that occurs across the transistor switch.

Thus the arrangement according to the invention can be used as a two terminal device, that is to say, as a device that requires no separate power supply. If desired additional terminals may be included for example a third terminal to shunt any overcurrent across the load, for example as described in our copending international application No. PCT/GB91/01760 the disclosure of which is incorporated herein by reference.

DETAILED DESCRIPTION OF THE INVENTION

The arrangement according to the present invention has the advantage that it enables much flatter performance variations with respect to temperature to be obtained. In addition, it is possible to run the circuit protection arrangement according to the invention at considerably higher circuit currents without the danger of it tripping under the normal circuit current. In many cases the arrangement can be operated with up to 80% of the trip current without danger of it tripping.

The simplest form of arrangement may comprise a comparator circuit, for example in the form of an open loop operational amplifier, having one input terminal that is connected to a voltage reference and another terminal that samples the voltage difference across the switch by means of a voltage divider. The voltage reference should have a relatively temperature stable performance, preferably having a temperature coefficient of not more than $\pm 0.5\% K^{-1}$, more preferably not more than $\pm 0.2\% K^{-1}$ and especially not more than $0.1\% K^{-1}$. Normally a Zener diode or band gap device will be employed as the voltage regulator.

The circuit protection arrangement according to the invention may employ bipolar transistors and/or field effect transistors. Where bipolar transistors are used as the switch they are preferably used in a Darlington configuration in order to reduce the base current required when the transistor is switched ON. This base current must be supplied via the comparator, optionally with a base driver circuit. If a Darlington pair or triplet is employed as the switching transistor, the effective d.c. current gain will be increased considerably so that a much higher base input impedance can be used.

Where field effect transistors are employed, MOSFETs are preferred, especially enhancement mode MOSFETs. The arrangement may be produced as an integrated circuit, in which case the resistors employed in the switching circuit may be provided by MOSFETs, for example with their gates and drains connected in nMOS logic. Alternatively, the control transistor and the resistor which together form the voltage divider for the base or gate of the switching transistor may be provided by a complementary n-channel and p-channel pair of FETS connected in the manner of CMOS logic.

In a preferred embodiment of the invention, the arrangement includes a pulse generator which, when the switch has opened, will send one or more pulses to the switch to close or attempt to close the switch. Such forms of pulse generator are described for example in our copending British patent application No. 9022261.3 filed on Oct. 12, 1990 and our British patent application No. 9026518.2 which was filed on Dec. 5, 1990 and was incorporated in International patent application No. PCT/GB91/01761. The disclosure of the British applications is incorporated herein by reference. As will be appreciated, insofar as the arrangement according to the present invention incorporates a resetting pulse generator, it is a modification of the inventions described in the British patent applications mentioned above.

Any of a number of means may be used to generate the pulses. Especially where a large number of pulses is intended to be generated, for example they may be generated by an astable oscillator known per se. In order to provide a sufficient time delay between the pulses, it may be appropriate for the pulse generator to include a divider, for example a counter or shift register, whose input is supplied by a relatively fast oscillator, eg. a crystal device or other circuit. Indeed, it may be possible for the user to specify the pulse frequency by selecting the divider output that attempts to reset the switch. The output of the divider will normally be fed to the comparator input via a high pass filter although a monostable vibrator could be used. If the pulse generator or any other components need a power supply, it is usually simplest to take the supply from the voltage difference across the switch optionally after appropriate voltage regulation, for example by means of a Zener diode.

If desired, the pulse generator may generate pulses to a predetermined finite maximum number or for a predetermined time as described in British patent application No. 9022261.3 mentioned above.

The arrangement according to the invention may be formed using discrete components or it may be formed monolithically using well known techniques. Preferably the arrangement is made in monolithic integrated form as such devices are less expensive and are also smaller. The use of a divider as described above has the advantage that the value of any capacitors in the pulse generator circuit may be significantly smaller than those that would be required in the absence of the divider, thereby making the circuit more suitable for monolithic integration.

It is preferred for the arrangement to include no resistive components in series with the transistor switch. Such an arrangement not only reduces the voltage drop along the line of the circuit, but, more importantly, reduces the area of silicon that need be employed in an integrated circuit design of the arrangement, thereby reducing the cost.

BRIEF DESCRIPTION OF THE DRAWINGS

Two forms of arrangement in accordance with the present invention will now be described by way of example with reference to the accompanying drawings, in which.

DETAILED DESCRIPTION OF THE DRAWINGS

Figure 1:
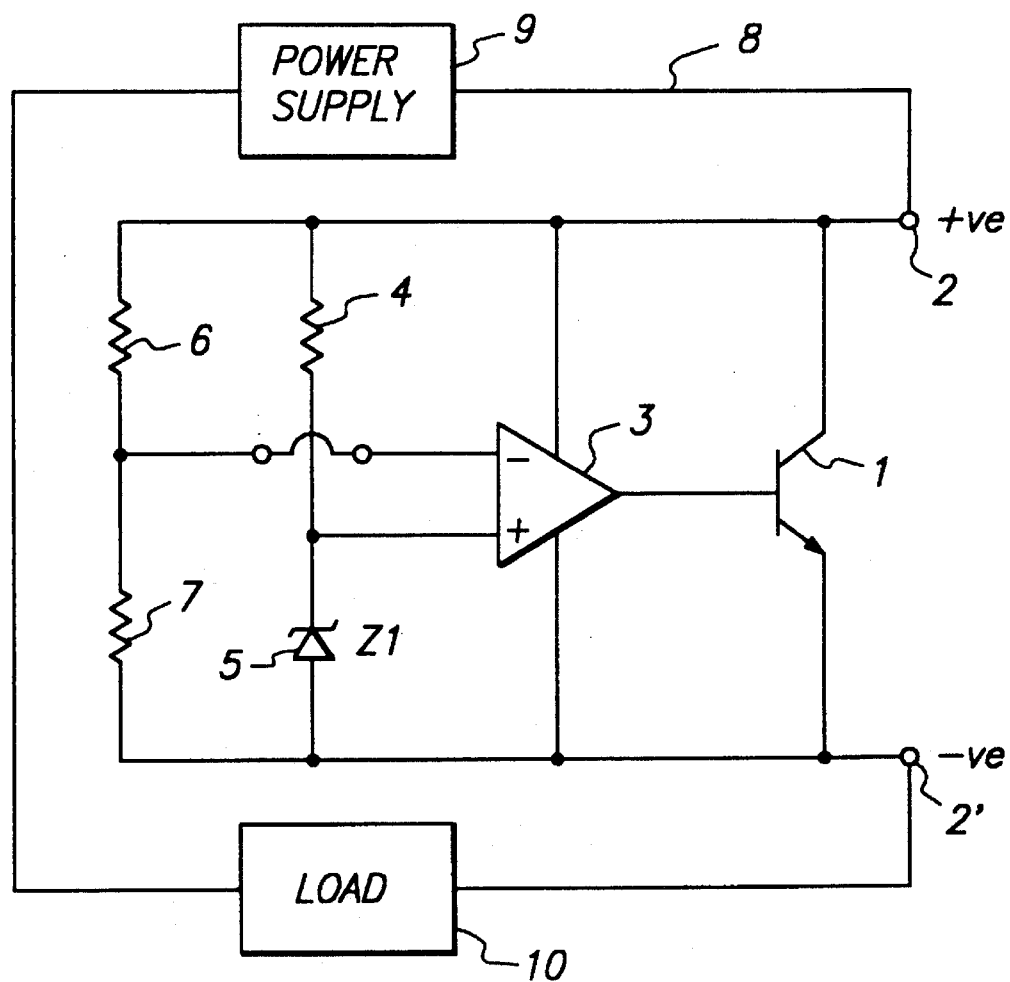
FIG. 1 is a circuit diagram of one form of two-terminal device according to the invention.

Referring to FIG. 1 of the accompanying drawings, an arrangement for protecting an electrical circuit 8 from an overcurrent comprises an NPN bipolar junction transistor 1 acting as a switch that is located between terminals 2 and 2' and can be series connected in a line of the circuit. The base of the transistor 1 is connected to the output of an op amp 3 acting as a comparator. The non-inverting input of the op-amp is connected to a voltage divider formed by resistor 4 and Zener diode 5, and the inverting input is connected to a second voltage divider formed by resistors 6 and 7, both voltage dividers spanning the switching transistor 1. The Zener diode 5 had a temperature coefficient of $-0.06\%K^{-1}$.

The Vcc and ground rail terminals of the op amp 3 are also connected across the switching transistor 1 so that the op amp will be powered up when the arrangement experiences an overcurrent.

In operation, the switching transistor 1 will be in its OFF state until sufficient voltage has developed across it to cause the comparator 3 output to drive the base of switching transistor 1. At this stage the non-inverting input of the comparator 3 will be at a higher voltage than the inverting input in view of the relatively high initial impedance of Zener diode 5, so that the base of the switching transistor 1 will be driven higher than its emitter and it will conduct. When the arrangement is subjected to an overcurrent, for example from a current transient or a load or source failure, the voltage difference across the switching transistor 1 will increase and so the voltage at the inverting input of the op amp 3 will increase. The voltage at the non-inverting input of the op-amp 3 will also increase until it reaches the Zener voltage of Zener diode 5 whereupon it will remain relatively constant. Thus, at higher overcurrents the output of the op amp will go low, approaching the negative rail voltage, and will switch the switching transistor 1 off.

Figure 2:
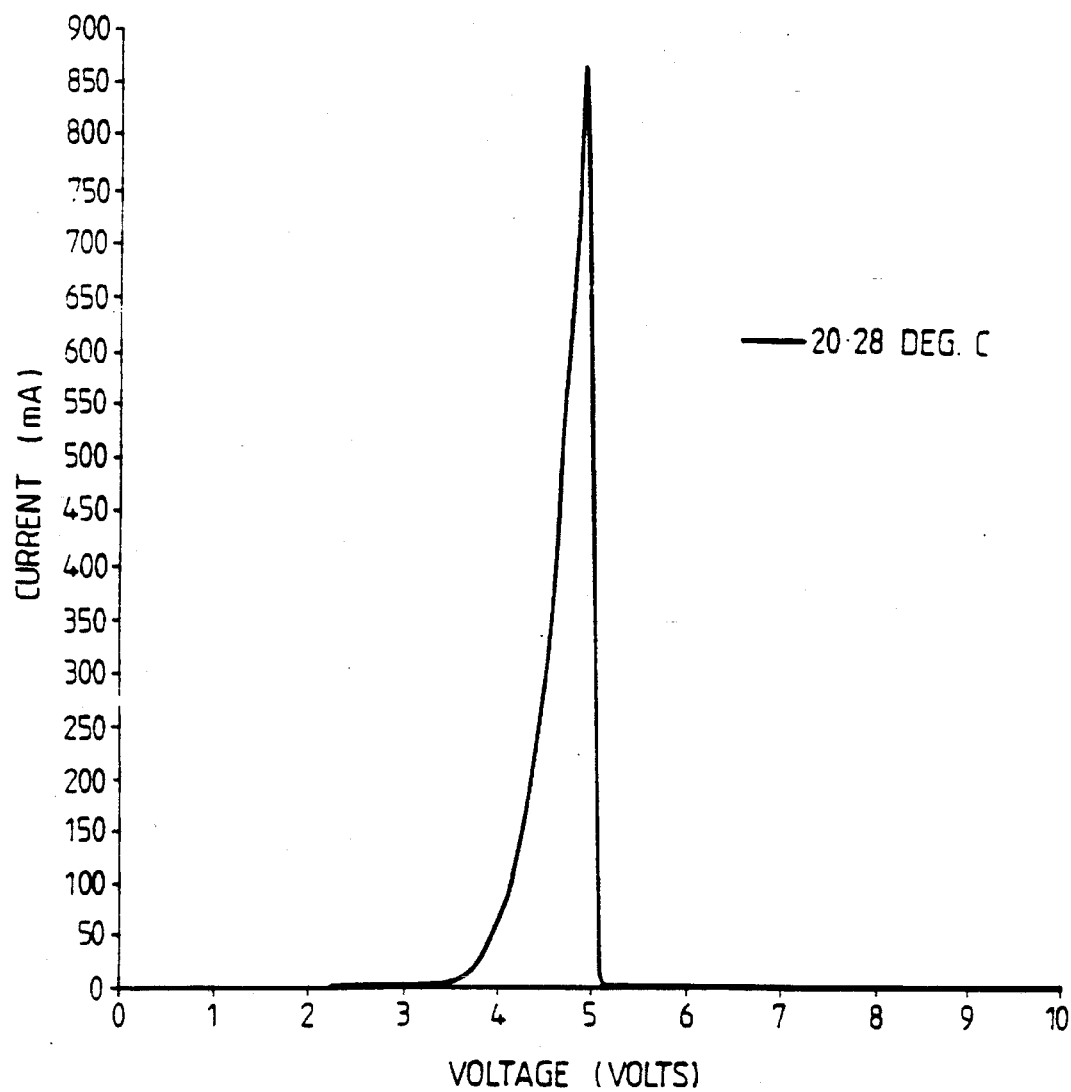
FIG. 2 is a graphical representation of the I-V characteristics of the arrangement shown in FIG. 1.
Figure 3:
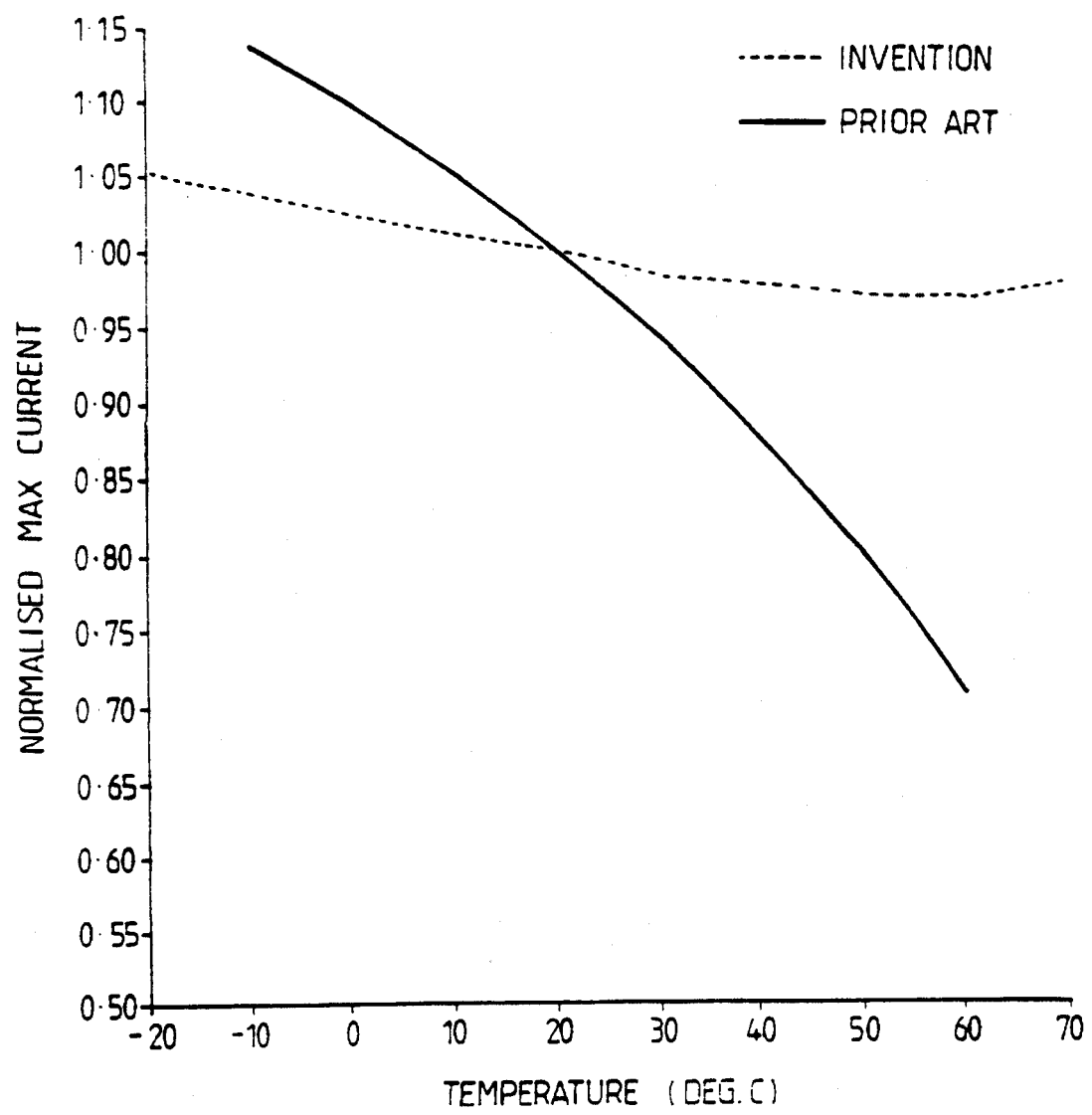
FIG. 3 is a graphical comparison of the temperature variation of the arrangement shown in FIG. 1 with that of the arrangement described in German application No. 37 25 390.

FIG. 2 shows the pass current of the arrangement against the voltage across the switching transistor 1, and FIG. 3 shows the temperature stability of the arrangement as compared with that of an arrangement as shown in German application No. 37 25 390 employing a Darlington pair as the switching transistor. As can be seen from FIG. 3, the performance of the arrangement according to the invention is much flatter with regard to temperature than that of the prior art arrangement. This temperature stability has been found to enable the maximum operating current of the circuit to be increased to a significant proportion of the trip current without inadvertant tripping of the device as compared with the prior art arrangements which were liable to tripping at operating currents that were relatively low in comparison to the trip current.

Figure 4:
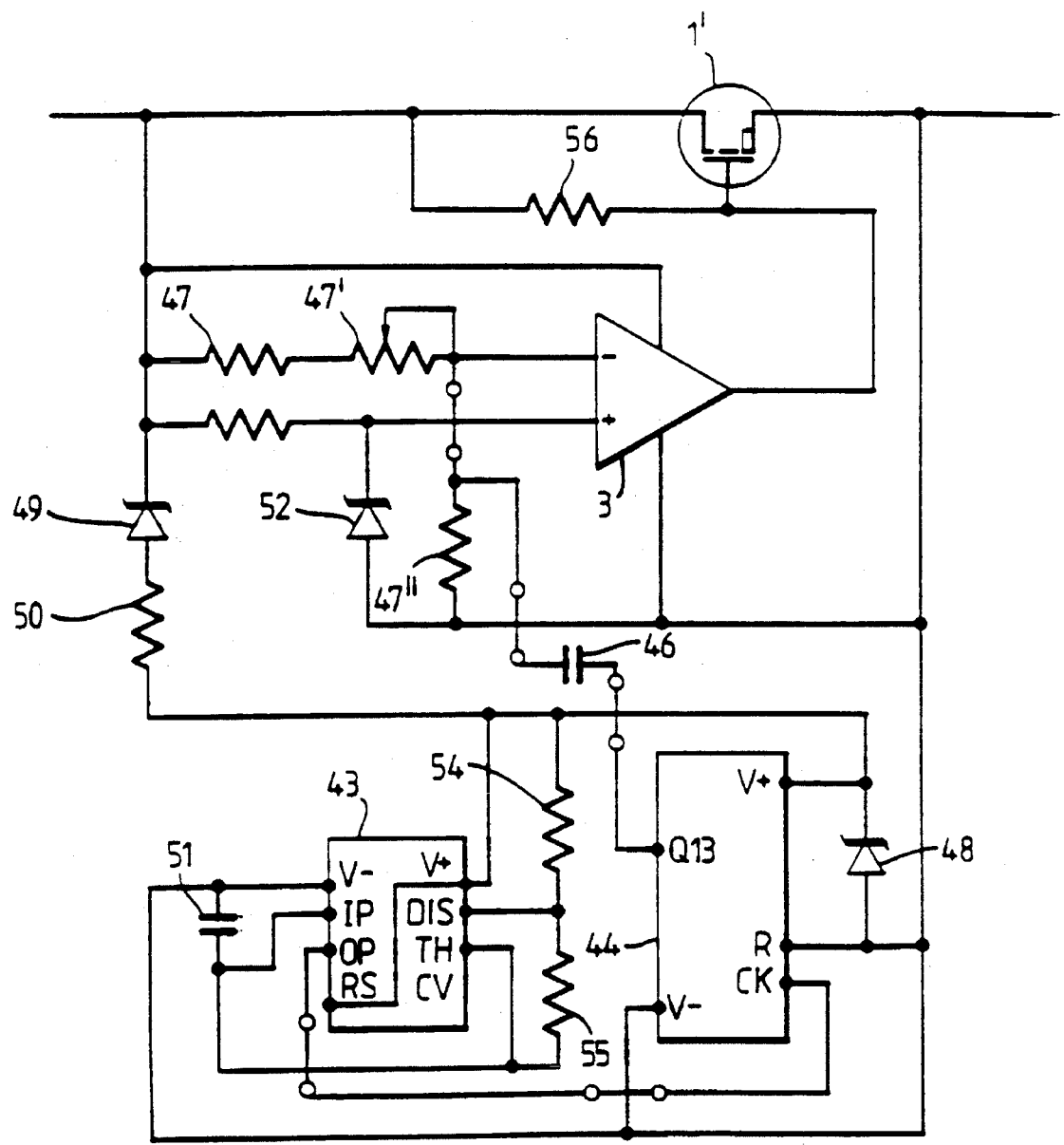
FIG. 4 is a circuit diagram of a second form of arrangement that includes a resetting pulse generator.

FIG. 4 shows a second form of arrangement according to the invention which incorporates a resetting pulse generator which will attempt to close the switching transistor 1 about once every 20 seconds after it has opened.

The switching circuit comprises a switching transistor 1' in the form of an enhancement mode MOSFET, and is substantially as described with respect to FIG. 1 with the exception that the bipolar switching transistor 1 has been replaced by a FET 1'.

The pulse generator comprises an astable oscillator provided in this case by a 555 timer 43 whose output is fed into the clock input of a 4020 14 bit counter 44 acting as a divider. The output of the counter 44 is fed into the inverting input of op amp 3 via a high pass RC filter formed by 33 nF capacitor 46, 1 Mohm resistor 47, variable resistor 47' and 1 Mohm resistor 47". The output of op amp 3 is fed directly to the gate of transistor 1'. A 1 Mohm pull-up resistor 56 is connected between the op amp 3 output and the drain of transistor 1' since the op amp 3 has an open collector.

The 555 timer 43 and counter 44 are powered by a supply taken across the switching transistor 1' and regulated to some extent by Zener diode 48 connected across the supply and ground pins of the devices. Zener diode 48 also protects the counter 44 and timer 43 against the overvoltage. A further 6.8 V Zener diode 49 and 5 kohm resistor 50 are connected in series between the Vcc pins of the timer 43 and counter 44 and the drain of the switching transistor 1'.

In operation the switching transistor 1' will normally be ON with op amp 3 output high. When an overcurrent is experienced, the inverting input voltage of the op amp will rise while the non-inverting input voltage is regulated by 3.9V Zener diode 52 (having a temperature coefficient of $-0.06\%K^{-1}$ so that the op amp output goes low, ie. toward the source voltage of the transistor 1', thereby tuning the transistor 1 OFF. When the switching transistor 1' has been tuned OFF the voltage across it will rise to above 10 V and so provide a roughly constant supply to the timer 43 and counter 44 by virtue of Zener diode 48. The leakage current flowing through the timer and counter supply circuit will be limited by the resistor 50 and will normally be in the order of 1 to 2 mA. When the timer 43 has been powered up it will oscillate with a frequency dependent on the capacitance of capacitor 51 and resistor 54 and 55, and will typically be in the order of 400 Hz, eg. for a capacitor of 1 nF capacitance and resistors of 1 Mohm resistance. This oscillation is fed into the clock input of the counter 44, and the most significant bit is taken as the output, having a repetition rate of about once every 20 seconds.

When the counter output falls to its low value the inverting input of the op amp 3 is briefly brought low (to the source voltage of switching transistor 1') thereby causing the op amp output to rise for a short time (depending on the time constant of capacitor 46 and resistor 47) and tun transistor 1' ON. If the overcurrent still persists the output of the op amp 3 will fall as soon as the pulse finishes and the switching transistor 1' will remain OFF. Thus the arrangement attempts to reset the switching transistor 1' every 20 seconds once it has tripped until it is reset.

We claim:

1. A circuit protection arrangement that is series connected in a line of an electrical circuit to be protected, which comprises a transistor switch that controls the circuit current and has a control input, and a control arrangement that controls the voltage of the control input and is responsive to an overcurrent through the switch, the control arrangement comprising a comparator circuit that compares a fraction of the voltage across the switch with a reference voltage and opens the switch if the fraction is greater than the reference voltage, the comparator circuit being powered by a voltage drop in the line across the switch.

2. An arrangement as claimed in claim 1, wherein the switch comprises an enhancement mode MOSFET whose gate provides the control input.

3. An arrangement as claimed in claim 1, wherein the voltage reference comprises a Zener diode or a bandgap device.

4. An arrangement as claimed in claim 1, which includes a pulse generator which, when the switch has opened, will send one or more pulses to the switch to close or to attempt to close the switch.

5. An arrangement as claimed in claim 4, wherein the pulse generator comprises a divider whose input is supplied by an astable oscillator.

6. An arrangement as claimed in claim 4, wherein the or each pulse generated by the pulse generator has a length of not more than 250 ms.

7. An arrangement as claimed in claim 4, wherein the pulse generator will generate pulses to a predetermined finite maximum number.

8. An arrangement as claimed in claim 1, which includes no resistive components in series with the transistor switch.

9. An arrangement as claimed in claim 2, wherein the voltage reference comprises a Zener diode or a bandgap device.

10. An arrangement as claimed in claim 2, which includes a pulse generator which, when the switch has opened, will send one or more pulses to the switch to close or to attempt to close the switch.

11. An arrangement as claimed in claim 3, which includes a pulse generator which, when the switch has opened, will send one or more pulses to the switch to close or to attempt to close the switch.

12. An arrangement as claimed in claim 9, which includes a pulse generator which, when the switch has opened, will send one or more pulses to the switch to close or to attempt to close the switch.

13. An arrangement as claimed in claim 5, wherein the or each pulse generated by the pulse generator has a length of not more than 250 ms.

14. An arrangement as claimed in claim 5, wherein the pulse generator will generate pulses to a predetermined finite maximum number.

15. An arrangement as claimed in claim 6, wherein the pulse generator will generate pulses to a predetermined finite maximum number.

16. An arrangement as claimed in claim 4, wherein the pulse generator will generate pulses for a predetermined time.

17. An arrangement as claimed in claim 5, wherein the pulse generator will generate pulses for a predetermined time.

18. An arrangement as claimed in claim 6, wherein the pulse generator will generate pulses for a predetermined time.

19. An arrangement as claimed in claim 1, wherein the reference voltage is obtained from the voltage drop in the line across the switch.

* * * * *

UNITED STATES PATENT AND TRADEMARK OFFICE
CERTIFICATE OF CORRECTION

PATENT NO. : 5,465,188

DATED : Pryor et al.

INVENTOR(S) : November 7, 1995

It is certified that error appears in the above-indentified patent and that said Letters Patent is hereby corrected as shown below:

Column 1, line 53, replace "included" by --included,--.

Column 3, line 44, after "circuit" insert --8. Also shown in the circuit 8 are supply 9 and load 10.--.

Column 4, line 66, replace "resistor" by --resistors--.

Column 5, line 9, replace "tun" by --turn--.

Signed and Sealed this

Thirteenth Day of February, 1996

Attest:

BRUCE LEHMAN

*Attesting Officer*     Commissioner of Patents and Trademarks